United States Patent [19]

England et al.

[11] Patent Number: 4,487,668
[45] Date of Patent: Dec. 11, 1984

[54] FLUORINATED ION EXCHANGE POLYMER CONTAINING CARBOXYLIC GROUPS, AND FILM AND MEMBRANE THEREOF

[75] Inventors: David C. England; Paul R. Resnick, both of Wilmington, Del.

[73] Assignee: E. I. Du Pont de Nemours and Company, Wilmington, Del.

[21] Appl. No.: 526,397

[22] Filed: Aug. 25, 1983

Related U.S. Application Data

[63] Continuation of Ser. No. 347,087, Feb. 8, 1982, abandoned, which is a continuation of Ser. No. 207,501, Nov. 17, 1980, abandoned, which is a continuation of Ser. No. 789,725, Apr. 20, 1977, abandoned.

[51] Int. Cl.³ ............................................. C25B 1/14
[52] U.S. Cl. ....................................... 204/98; 204/100; 204/252; 204/296; 210/500.2; 428/421; 428/422; 521/27
[58] Field of Search ............................... 428/421, 422; 210/500.2; 204/98, 252, 100, 296; 528/391; 526/242, 245, 243, 247; 521/27; 560/180, 184

[56] References Cited

U.S. PATENT DOCUMENTS

| | | | |
|---|---|---|---|
| 4,065,366 | 12/1977 | Oda et al. | 204/296 |
| 4,090,932 | 5/1978 | Kazihara et al. | 204/98 |
| 4,116,888 | 9/1978 | Ukihashi et al. | 526/245 |
| 4,126,588 | 11/1978 | Ukihashi et al. | 204/296 |
| 4,140,615 | 2/1979 | Kadija et al. | 204/98 |
| 4,151,053 | 4/1979 | Seko et al. | 204/296 |
| 4,176,215 | 11/1979 | Molnar et al. | 428/421 |

Primary Examiner—John J. Gallagher

[57] ABSTRACT

Fluorinated ion exchange polymers which have pendant side chains which contain

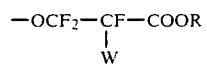

groups wherein W is F or $CF_3$, and R is an ionizable group, or which have such pendant side chains and also pendant side chains which contain sulfonyl groups, when used in the form of membranes to separate the anode and cathode compartments of an electrolysis cell, permit operation at high current efficiency. They can be made by copolymerization of a mixture of monomers, one of which is a vinyl monomer which contains the indicated carboxylic functional group.

9 Claims, No Drawings

FLUORINATED ION EXCHANGE POLYMER CONTAINING CARBOXYLIC GROUPS, AND FILM AND MEMBRANE THEREOF

This is a continuation of application Ser. No. 347,087, filed Feb. 8, 1982 now abandoned which was a continuation of application Ser. No. 207,501, filed Nov. 17, 1980, now abandoned, which was, in turn, a continuation of application Ser. No. 789,725, filed Apr. 20, 1977, now abandoned.

BACKGROUND OF THE INVENTION

This invention concerns improvements in and relating to fluorinated ion exchange polymers, and particularly to such polymers used in the form of films and membranes used in chloralkali electrolysis cells.

Fluorinated ion exchange membranes are known in the art. The fluorinated ion exchange polymer in such membranes can be derived from a fluorinated precursor polymer which contains pendant side chains in sulfonyl fluoride form. The sulfonyl fluoride functional groups have been converted to ionic form in various ways, for example, to sulfonate salts by hydrolysis with an alkaline material, to the sulfonic acid by acidification of the salts, and to the sulfonamide by treatment with ammonia. Examples of such teachings in the art can be found in U.S. Pat. Nos. 3,282,875, 3,784,399, and 3,849,243.

Although such polymers and membranes have many desirable properties which make them attractive for use in the harsh chemical environment of a chloralkali cell, such as good long-term chemical stability, their current efficiencies are not as high as is desired, especially when the caustic is produced at high concentration. As transport of hydroxyl ion in a chloralkali cell from the catholyte through the membrane to the anolyte increases, current efficiency drops. Larger amounts of oxygen impurity in the chlorine are thereby produced, and there is a greater buildup of chlorate and hypochlorite contaminants in the brine, which contaminants must be removed and discarded to maintain acceptable cell operation. Current efficiencies of at least 90% are highly desirable.

Accordingly, there is a need for polymers and membranes which will permit cell operation at high current efficiencies, and especially for those which will permit operation at high efficiencies over long periods of time.

SUMMARY OF THE INVENTION

It has now been found that fluorinated ion exchange polymers and membranes which contain pendant side chains either in ionic carboxylic form, or in both ionic sulfonyl and ionic carboxylic form, have high current efficiencies.

More specifically, according to the present invention, there is provided a polymer having the repeating units

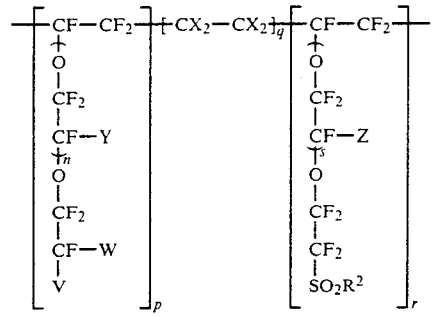

wherein
n is 1 or 2,
p is 1 to 10,
q is 3 to 15,
r is 0 to 10,
s is 0, 1, 2 or 3,
the X's taken together are four fluorines or three fluorines and one chlorine,
W is F or $CF_3$,
Y is F or $CF_3$,
Z is F or $CF_3$
V is $-COOR^1$ or $-CH$,
$R^1$ is H, lower alkyl or $$M_{(\frac{1}{t})},$$

$R^2$ is F, Cl or $OR^3$,
$R^3$ is H or $$M_{(\frac{1}{t})},$$

M is alkali metal, alkaline earth metal, ammonium or quaternary ammonium, and
t is the valence of M.

There is also provided according to the present invention a film or membrane of a fluorinated ion exchange polymer which has pendant side chains which contain $-OCF_2CF_2COOR^1$ groups wherein $R^1$ is H or $$M_{(\frac{1}{t})},$$

M is alkali metal, alkaline earth metal, ammonium or quaternary ammonium, and t is the valence of M, said polymer having an equivalent weight no greater than about 2000, preferably no greater than about 1500.

More specifically, the fluorinated ion exchange polymer in the film or membrane has the repeating units

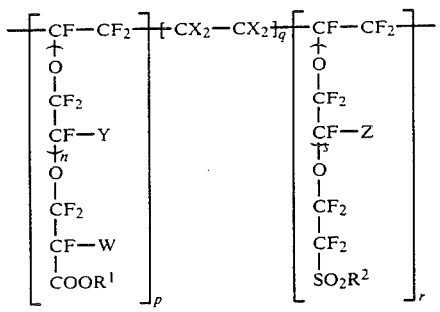

wherein
n is 1 or 2,
p is 1 to 10,
q is 3 to 15,
r is 0 to 10,
s is 0, 1, 2 or 3,
the X's taken together are four fluorines or three fluorines and one chlorine,
W is F or $CF_3$,
Y is F or $CF_3$,
Z is F or $CF_3$,
$R^1$ is H, lower alkyl or $$M_{(\frac{1}{t})},$$

$R^2$ is F, Cl or $OR^3$,
$R^3$ is H or $$M_{(\frac{1}{t})},$$

M is alkali metal, alkaline earth metal, ammonium or quaternary ammonium, and
t is the valence of M.

The ion exchange membranes fabricated of the polymers of the present invention which contain ionizable carboxylic, or both ionizable carboxylic and sulfonyl groups, as active ion exchange sites are highly desirable in comparison with prior art ion exchange membranes for several distinct reasons. Most importantly, outstanding efficiencies in a chlor-alkali cell have been obtained with film, membranes, and laminar structures thereof in comparison with similar structures which contain only sulfonic acid ion exchange groups obtained by hydrolysis of pendant sulfonyl groups. This improvement is considered to be of predominant importance in commercial applicability in reducing the cost of producing a unit of chlorine and caustic. Illustratively, in a chloralkali plant producing, for example, 1000 tons per day of chlorine, the direct savings in electrical power for only a 1% increase in efficiency are very significant.

The technically advanced polymers of the present invention are characterized by their outstanding stability toward caustic. It has been found, for example, that the polymers of the invention are significantly more stable toward caustic than similar polymers wherein the carboxylic groups are in pendant side chains of the polymer which terminate as $-OCF_2COOR$ groups.

DESCRIPTION OF THE PREFERRED EMBODIMENTS

A need has developed in the chlor-alkali industry for improved ion exchange materials which can be used to replace existing cell compartment separators which have been used for decades without substantial improvement in design.

For use in the environment of a chlor-alkali cell, the membrane must be fabricated from a material which is capable of withstanding exposure to a hostile environment, such as chlorine and solutions which are highly alkaline. Generally, hydrocarbon ion exchange membranes are totally unsatisfactory for this kind of use because such membranes cannot withstand this environment.

For commercial use in the chlor-alkali industry, a film must go beyond the ability to be operable for prolonged time periods in the production of chlorine and caustic. A most important criterion is the current efficiency for conversion of brine in the electrolytic cell to the desired products. Improvement in current efficiency can translate into pronounced savings in the cost of production of each unit of chlorine and caustic. Additionally, from a commercial standpoint the cost of production of each unit of products will be determinative of the commercial suitability of an ion exchange membrane.

The ion exchange polymers of the present invention possess pendant side chains which contain carboxylic, or both carboxylic and sulfonyl groups, attached to carbon atoms having at least one fluorine atom connected thereto, as set forth above.

The ion exchange polymers of the present invention which possess pendant side chains which contain carboxylic, or both carboxylic and sulfonyl groups, possess general utility as ion exchange resins. When used in a film or membrane to separate the anode and cathode compartments of an electrolysis cell, such as a chloralkali cell, the polymer should have a total ion exchange capacity of 0.5 to 1.6 meq/g (milliequivalents/gram), preferably from 0.8 to 1.3 meq/g. Below an ion exchange capacity of 0.5 meq/g, the electrical resistivity becomes too high, and above 1.6 meq/g the mechanical properties are poor because of excessive swelling of the polymer. The values of p, q and r in the above formulas of the copolymer should be adjusted or chosen such that the polymer has an equivalent weight no greater than about 2000, preferably no greater than about 1500, for use as an ion exchange barrier in an electrolytic cell. The equivalent weight above which the resistance of a film or membrane becomes too high for practical use in an electrolytic cell varies somewhat with the thickness of the film or membrane. For thinner films and membranes, equivalent weights up to about 2000 can be tolerated. For most purposes, however, and for films of ordinary thickness, a value no greater than about 1500 is preferred.

The polymers of the invention can be made by copolymerizing a mixture of the appropriate monomers. The carboxylic-containing monomer is one or more compounds from a first group represented by the formula

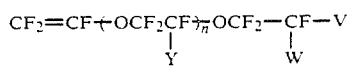

wherein
V is $-COOR^1$ or $-CN$,
$R^1$ is H, lower alkyl or $$M_{(\frac{1}{t})}.$$

M is alkali metal, alkaline earth metal, ammonium or quaternary ammonium,
t is the valence of M,
W is F or $CF_3$,
Y is F or $CF_3$, and
n is 1 or 2.

The most preferred monomers are those wherein V is $-COOR^1$ wherein $R^1$ is H or lower alkyl, generally $C_1$ to $C_5$, because of ease in polymerization and conversion to ionic form. Those monomers wherein n is 1 are also preferred because their preparation and isolation in good yield is more easily accomplished than when n is 2.

Preparation of those monomers wherein V is $-COOR^1$ where $R^1$ is lower alkyl is described in U.S. Ser. No. 789,724 in the name of D. C. England, filed Apr. 20, 1977. The compounds $$CF_2\!=\!CFOCF_2\underset{\underset{CF_3}{|}}{C}FOCF_2CF_2COOCH_3, \text{ and}$$

$$CF_2\!=\!CFO(CF_2\underset{\underset{CF_3}{|}}{C}FO)_2CF_2CF_2COOCH_3,$$

whose preparation is described therein, and the corresponding free carboxylic acids are especially useful monomers.

Preparation of monomers wherein V is —CN is described in U.S. Pat. No. 3,852,326.

The carboxylic-containing monomer of the first group is copolymerized with one or more fluorinated vinyl compounds from a second group such as vinyl fluoride, hexafluoropropylene, vinylidene fluoride, trifluoroethylene, chlorotrifluoroethylene, perfluoro(alkyl vinyl ether), tetrafluoroethylene and mixtures thereof. In the case of copolymers which will be used in electrolysis of brine, the precursor vinyl monomer desirably will not contain hydrogen.

Optionally, there may be included along with the monomers from the first and second groups, one or more monomers from a third group, which is the sulfonyl-containing monomers containing the precursor group $-CF_2-CF_2-SO_2A$, wherein A is F or Cl, preferably F. Additional examples can be represented by the general formula $CF_2\!=\!CF-T_k-CF_2SO_2F$ wherein T is a bifunctional perfluorinated radical comprising 1 to 8 carbon atoms, and k is 0 or 1. The particular chemical content or structure of the radical T is not critical, but it must have a fluorine atom attached to the carbon atom to which the $-CF_2SO_2F$ group is attached. Other atoms connected to this carbon can include fluorine, chlorine, or hydrogen although generally hydrogen will be excluded when the copolymer for ion exchange will be used in a chlor-alkali cell. The T radical of the formula above can be either branched or unbranched, i.e., straight-chain, and can have one or more ether linkages. It is preferred that the vinyl radical in this group of sulfonyl fluoride containing comonomers be joined to the T group through an ether linkage, i.e., that the comonomer be of the formula $CF_2\!=\!CF-O-T-CF_2-SO_2F$. Illustrative of such sulfonyl fluoride containing comonomers are $CF_2\!=\!CFOCF_2CF_2SO_2F$, $$CF_2\!=\!CFOCF_2\underset{\underset{CF_3}{|}}{C}FOCF_2CF_2SO_2F,$$

$$CF_2\!=\!CFOCF_2\underset{\underset{CF_3}{|}}{C}FOCF_2\underset{\underset{CF_3}{|}}{C}FOCF_2CF_2SO_2F,$$

$$CF_2\!=\!CFCF_2CF_2SO_2F, \text{ and } CF_2\!=\!CFOCF_2\underset{\underset{\underset{\underset{\underset{CF_3}{|}}{O}}{|}}{\underset{CF_2}{|}}}{C}FOCF_2CF_2SO_2F.$$

The most preferred sulfonyl fluoride containing comonomer is perfluoro(3,6-dioxa-4-methyl-7-octenesulfonyl fluoride), $$CF_2\!=\!CFOCF_2\underset{\underset{CF_3}{|}}{C}FOCF_2CF_2SO_2F.$$

The sulfonyl-containing monomers are disclosed in such references as U.S. Pat. Nos. 3,282,875, 3,041,317, 3,718,627 and 3,560,568.

The copolymers of the invention can be prepared by general polymerization techniques developed for homo- and copolymerizations of fluorinated ethylenes, particularly those employed for tetrafluoroethylene which are described in the literature. Nonaqueous techniques for preparing the copolymers of the present invention include that of U.S. Pat. No. 3,041,317, that is, by the polymerization of a mixture of the desired component monomers in the presence of a free radical initiator, preferably a perfluorocarbon peroxide or azo compound, at a temperature in the range 0°–200° C. and at pressures in the range 1–200, or more atmospheres. The nonaqueous polymerization may, if desired, be carried out in the presence of a fluorinated solvent. Suitable fluorinated solvents are inert, liquid, perfluorinated hydrocarbons, such as perfluoromethylcyclohexane, perfluorodimethylcyclobutane, perfluorooctane, perfluorobenzene and the like, and inert, liquid chlorofluorocarbons such as 1,1,2-trichloro-1,2,2-trifluoroethane, and the like.

Aqueous techniques for preparing the copolymers of the invention include contacting the monomers with an aqueous medium containing a free-radical initiator to obtain a slurry of polymer particles in non-water-wet or granular form, as disclosed in U.S. Pat. No. 2,393,967, or contacting the monomers with an aqueous medium containing both a free-radical initiator and a telogenically inactive dispersing agent, to obtain an aqueous colloidal dispersion of polymer particles, and coagulating the dispersion, as disclosed, for example, in U.S. Pat. Nos. 2,559,752 and 2,593,583.

The polymers of the present invention can be fabricated into films and membranes.

When the polymer is in the form of a film, desirable thicknesses of the order of 0.05 to 0.5 mm (0.002 to 0.02 inch) are ordinarily used. Excessive film thicknesses will aid in obtaining higher strength, but with the resulting deficiency of increased electrical resistance.

The term "membrane" refers to non-porous structures for separating compartments of an electrolysis cell and which may have layers of different materials, formed, for example, by surface modification of films or by lamination, and to structures having as one layer a support, such as a fabric imbedded therein.

It is possible according to the present invention to make films and membranes wherein the pendant side chains are essentially wholly (i.e., 90% or more) or wholly (i.e., 99% to 100%) in the carboxylic form throughout the structure, and also wherein the pendant side chains throughout the structure are in carboxylic and sulfonyl form, for example 10 to 90% of each. Control in this respect is exercised in the choice of the mixture of monomers used in the polymerization.

In similar fashion, it is possible to make products where various other functional groups are present in pendant side chains, in combination with carboxylic groups in other pendant side chains. For example, when the precursor polymer contains sulfonyl halide groups, they can be treated with water, caustic, or other reagents such as ammonia or a primary amine, whereby the sulfonyl groups can be converted to sulfonic acid groups or metal salts thereof, or to sulfonamide or N-substituted sulfonamide groups. The technique whereby groups of the precursor polymer can be converted to the form $-(SO_2NH)_mQ$, wherein Q is H, $NH_4$, cation of an alkali metal and/or cation of an alkaline earth metal and m is the valence of Q, are set forth in U.S. Pat. No. 3,784,399. Preferred definitions of Q include $NH_4$ and/or cation of an alkaline metal particularly sodium or potassium. The technique whereby sulfonyl groups of the precursor polymer can be converted to N-monosubstituted sulfonamide groups and salts thereof are as set forth in Application U.S. Ser. No. 623,920 filed Oct. 20, 1975.

So that the final film or membrane will have as low an electrical resistivity as possible, it is desirable that essentially all of the carboxylic and sulfonyl groups in the polymer be in the form of active cation exchange groups, i.e. either carboxylic or sulfonyl groups of a type which will ionize or form metal salts. In this respect, it is highly undesirable for a film or membrane to be used for ion exchange purposes in an electrolytic cell to have a neutral layer, or that a film or membrane to be used in a chloralkali cell have either a neutral layer or an anion exchange layer. The films and membranes of the present invention do not have neutral or anion exchange layers. In this context, fiber or fabric reinforcing is not considered as a neutral layer, inasmuch as such reinforcing has openings, i.e., its effective area is not coextensive with the area of the film or membrane. In the case of films and membranes to be used as separators in a chloralkali cell, polymers which contain 40–100% pendant side chains containing carboxylic grousp and 0–60% pendant side chains containing sulfonyl groups provide excellent current efficiency. Those polymers wherein 100% of the functional groups are carboxylic groups, i.e., where r is zero in the structural formula, provide the highest current efficiency.

An equally important criterion in a chloralkali cell, however, is the amount of power required for each unit of chlorine and caustic. It is considered that the polymers of the type disclosed herein permit a proper combination of operating conditions to realize an excellent and unexpected reduction in power. Since the power requirement (which may be expressed in watt-hours) is a function of both cell voltage and current efficiency, low cell voltages are desirable and necessary. However, a polymer without a high current efficiency cannot operate effectively from a commercial standpoint even with extremely low cell voltages. Additionally, a polymer with an inherent high current efficiency allows a proper combination of parameters as in fabrication into the film and/or operation of the electrolytic cell to realize the potential theoretical reduction in power. Illustratively, the polymer can be fabricated at a lower equivalent weight which may result in some loss of current efficiency which is more than compensated by a reduction in voltage. Polymers of the present invention which have 50–95% pendant side chains containing carboxylic groups and 5–50% pendant side chains containing sulfonyl groups have low power consumption.

It is also possible according to the present invention to make films and membranes which are structured to have one surface wherein the pendant side chains of the polymer are in the carboxylic form, or in both carboxylic and sulfonyl form, and the other surface wherein the pendant side chains of the polymer are wholly in the sulfonyl form. It is further possible to make films and membranes structured to have both surfaces wherein the pendant side chains of the polymer are in the carboxylic form, or in both carboxylic and sulfonyl form, and an interior layer wherein the pendant side chains of the polymer are wholly in the sulfonyl form.

When only one surface of the structure contains carboxylic groups, the thickness of the carboxylic layer will normally be from 0.01% to 80% of the total thickness. When both surfaces contain carboxyl groups, the thickness of each surface layer will be less than half the thickness of the structure, and will normally be from 0.01 to 40% of the thickness. The thickness of a layer which contains carboxylic groups will ordinarily be at least 200 angstroms. Laminar structures can be made by melt-pressing together layers of the desired composition. When only one surface of the structure contains carboxylic groups, that surface can face either the anode or cathode in an electrolysis cell, and in the case of a chloralkali cell it will ordinarily face the cathode.

Under most circumstances, layered structures will be such that the layer which contains carboxylic groups will be about ¼ to 5 mils thick, the base layer (which will usually contain sulfonyl groups) will be about 1 to 15 mils thick, and the total thickness of the structure will be about 2 to 20 mils thick. The indicated thicknesses are effective film thicknesses, i.e., thicknesses which exclude reinforcing fibers and other members which do not contain ion exchange groups.

Polymers according to the present invention which contain either carboxylic groups, or both carboxylic and sulfonyl groups, have utility to function for ion exchange. Accordingly, general utility of the polymer for ion exchange is directly contemplated. Illustratively, permeation selection of cations is directly encompassed. One method of determination of cation exchange properties is a measurement of permselectivity with separation of the same cations in solutions but at different concentrations. This involves cation transport, and a permselectivity measurement of no voltage would indicate the polymer does not function for ion exchange.

A specific use for the polymers of the present invention which contain either carboxylic groups, or both carboxylic and sulfonyl groups, is in a chloralkali cell, such as disclosed in German patent application 2,251,660, published Apr. 26, 1973, and Netherlands patent application 72.17598, published June 29, 1973. In a similar fashion as these teachings, a conventional chloralkali cell is employed with the critical distinction of the type of polymeric film used to separate the anode and cathode portions of the cell from which chlorine and caustic are respectively produced from brine flowing within the anode portion of the cell. While the description of said German and Dutch publications is directed to use in a chloralkali cell, it is within the scope of the present disclosure to produce alkali or alkaline earth metal hydroxides and halogen such as chlorine from a solution of the alkali or alkali earth metal salt. While efficiencies in current and power consumption differ, the operating conditions of the cell are similar to those disclosed for sodium chloride.

An outstanding advantage has been found in terms of current efficiency in a chlor-alkali cell with the fluorinated polymers of the type disclosed herein with pendant groups present as either carboxylic groups, or both carboxylic and sulfonyl groups.

To further illustrate the innovative aspects of the present invention, the following examples are provided.

EXAMPLE 1

Copolymerization of Tetrafluoroethylene and $CF_2=CFOCF_2CF(CF_3)OCF_2CF_2COOCH_3$ A 330-ml stainless steel pressure tube was charged with 32.2 g $CF_2=CFOCF_2CF(CF_3)OCF_2CF_2COOCH_3$, 20 g tetrafluoroethylene and 15 ml of a solution containing 0.05% perfluoropropionyl peroxide in 1,1,2-trichloro-1,2,2-trifluoroethane. After heating for 3 hours at 50° C., the unreacted gases were vented and the liquid and solid product evaporated to dryness. The solid polymeric product was washed thoroughly with aqueous acetone and dried in a vacuum oven to give 3.9 g of white solid. The product was pressed into a clear 5-6 mil film at 240° C., reacted with a mixture of KOH, dimethyl sulfoxide and water and dried to give a copolymer of tetrafluoroethylene and $CF_2=CFOCF_2CF(CF_3)OCF_2CF_2COO^-K^+$. Infrared spectra showed the presence of appreciable carboxylate salt. Titration indicated the carboxylate content of the final product to be 0.98 meq/g and the equivalent weight to be 1020.

A four-inch diameter sample of the KOH-treated film (now 6-7 mils thick after the KOH treatment) was placed in a laboratory chlor-alkali cell operated at 2.0 asi (amps/in$^2$; 31 amps/dm$^2$), and the following results were obtained for a six-day test.

| Day | Sodium Hydroxide Product (%) | Current Efficiency (%) | Cell Voltage (Volts) |
|---|---|---|---|
| 1 | 29.05 | 93.2 | 3.91 |
| 2 | 28.76 | 92.6 | 3.95 |
| 5 | 23.06 | 90.9 | 3.96 |
| 6 | 24.50 | 87.6 | 4.08 |

EXAMPLE 2

Copolymerization of Tetrafluoroethylene and $CF_2=CFOCF_2CF(CF_3)OCF_2CF_2COOCH_3$ A 330-ml stainless steel pressure tube was charged with 40 g $CF_2=CFOCF_2CF(CF_3)OCF_2CF_2COOCH_3$, 26 g 1,1,2-trichloro-1,2,2-trifluoroethane, 20 g tetrafluoroethylene and 20 ml of a solution containing 0.05% perfluoropropionyl peroxide in 1,1,2-trichloro-1,2,2-trifluoroethane. After heating for 3 hours at 50° C., the unreacted gases were vented and the liquid and solid product evaporated to dryness. The solid polymeric product was washed thoroughly with aqueous acetone and dried in a vacuum oven to give 5.5 g of white solid. The product was pressed into a clear 5-6 mil film at 240° C., reacted with a mixture of KOH, dimethyl sulfoxide and water, and dried to give a copolymer of tetrafluoroethylene and $CF_2=CFOCF_2CF(CF_3)OCF_2CF_2COO^-K^+$. Infrared spectra showed the presence of appreciable carboxylate salt, while titration indicated the carboxylate content of the product to be 0.838 meq/g, and the equivalent weight to be 1190. The final film had a resistivity of 1.15 ohm-cm$^2$.

The four-inch diameter 5-6 mil film was placed in a laboratory chlor-alkali cell operated at 2.0 asi. After an initial four-day break-in period, the cell operated for 14 days at current efficiencies ranging from 89 to 97%, 35.5 to 37% sodium hydroxide concentration, and cell voltages of 4.4 to 5.1 volts. The flow of water to the cathode compartment was then increased to lower the sodium hydroxide concentration. After a few days during which cell operation was somewhat unsettled, the cell then was operated for 7 days at current efficiencies of 90 and 94%, sodium hydroxide concentration of 27 to 30%, and cell voltage of 4.2 to 4.6 volts.

EXAMPLE 3

Copolymerization of Tetrafluoroethylene and $CF_2=CFO[CF_2CF(CF_3)O]_2CF_2CF_2COOCH_3$ A 330-ml stainless steel pressure tube was charged with 31.1 g $CF_2=CFO[CF_2CF(CF_3)O]_2CF_2CF_2COOCH_3$, 20 g tetrafluoroethylene and 15 ml of a solution containing 0.05% perfluoropropionyl peroxide in 1,1,2-trichloro-1,2,2-trifluoroethane. After heating for 3 hours at 50° C., the unreacted gases were vented and the liquid and solid product evaporated to dryness. The solid polymeric product was washed thoroughly with aqueous acetone and dried in a vacuum oven to give 4.3 g of white solid. A small portion of the product was pressed into a thin film whose infrared spectrum showed the presence of appreciable carbomethoxy groups having an absorption at 5.6 microns.

EXAMPLE 4

Copolymerization of Tetrafluoroethylene, $CF_2=CFOCF_2CF(CF_3)OCF_2CF_2SO_2F$ and $CF_2=CFOCF_2CF(CF_3)OCF_2CF_2COOCH_3$ A 330-mil stainless steel pressure tube was charged with 25.4 g $CF_2=CFOCF_2CF(CF_3)OCF_2CF_2SO_2F$, 8.1 g $CF_2=CFOCF_2CF(CF_3)OCF_2CF_2COOCH_3$, 20 g tetrafluoroethylene and 15 ml of a solution containing 0.05% perfluoropropionyl peroxide in 1,1,2-trichloro-1,2,2-trifluoroethane. After heating for 3 hours at 50° C., the unreacted gases were vented and the remaining product washed thoroughly with aqueous acetone, filtered and dried in a vacuum oven. The 5.3 g of white solid polymeric product was pressed into a 5-6 mil film at 280° C. The infrared spectrum of this material showed the presence of appreciable carbomethoxy and sulfonyl fluoride groups having absorptions at 5.6 and 6.8 microns, respectively. After reaction with a mixture of dimethyl sulfoxide, KOH and water, the infrared spectrum showed that all the sulfonyl fluoride and carbomethoxy groups were converted to sulfonate and carboxylate groups, respectively.

A four-inch diameter 5-6 mil film of the copolymer of tetrafluoroethylene, $CF_2=CFOCF_2CF(CF_3)OCF_2CF_2SO_3K$ and $CF_2=CFOCF_2CF(CF_3)OCF_2CF_2COOK$, was placed in a laboratory chlor-alkali cell operated at 2.0 asi, and the following results obtained for a twelve-day test.

| Day | Sodium Hydroxide Product (% by wt) | Current Efficiency (%) | Cell Voltage (volts) |
|---|---|---|---|
| 1 | 43.0 | 71.0 | 4.73 |
| 2 | 31.5 | 60.3 | 4.65 |
| 6 | 34.0 | 63.4 | 4.57 |
| 7 | 34.0 | 63.8 | 4.60 |
| 12 | 32.0 | 71.0 | 4.60 |

EXAMPLE 5

A piece of 5-mil film of a copolymer of tetrafluoroethylene and perfluoro(3,6-dioxa-4-methyl-7-octenesulfonyl fluoride) having an equivalent weight of 1100 was placed in a press and one surface covered with 1 g of a powder of a copolymer of tetrafluoroethylene and methyl perfluoro(4,7-dioxa-5-methyl-8-honenoate) having an equivalent weight of 980. The material was heated for 4 minutes at 200° C. with no pressure and 2 minutes at 200° C. under 30,000 psi pressure. The resulting film was treated with a mixture of dimethylsulfoxide, water and potassium hydroxide at 90° C. for 1 hour, and washed and dried to give a clear film. The infrared spectrum of the resulting 8-8.5 mil thick film showed very strong carboxylate absorption at 5.95 microns. The film was placed in a chlor-alkali cell operated at 2.0 asi with the carboxylate side facing the catholyte and aqueous sodium chloride electrolyzed to give 29.5-37.8% NaOH at current efficiencies of 85-91% at a cell voltage of 3.8-4.0 volts.

EXAMPLE 6 a piece of 7-mil film of a copolymer of tetrafluoroethylene and perfluoro(3,6-dioxa-4-methyl-7-octenesulfonyl fluoride) having an equivalent weight of 1100, and which had a net of Teflon ®T-12 cloth imbedded in it and had one surface layer in which the sulfonyl fluoride groups were converted to the corresponding potassium sulfonate salt to a depth of 0.8 mil, was placed in a press with the sulfonyl fluoride surface up. The upper surface was covered with a powder of a copolymer of tetrafluoroethylene and methyl perfluoro(4,7-dioxa-5-methyl-8-nonenoate) having an equivalent weight of 996. The material was heated for 4 minutes at 210° C. with no pressure and one minute at 210° C. under 30,000 psi pressure. The resulting laminate was treated with a mixture of dimethyl sulfoxide, water and potassium hydroxide at 90° C. for one hour and washed with water to convert the remaining sulfonyl fluoride groups and ester groups to sulfonate and carboxylate, respectively. The laminate was placed in a chloroalkali cell operated at 2.0 asi with the carboxylate side facing the catholyte and aqueous sodium chloride electroylyzed to give 32.2-38.2% NaOH at current efficiencies of 90-96% at a cell voltage of 4.6-4.8 volts.

EXAMPLE 7

A mixture of 32.2 g perfluoro(4,7-dioxa-2,5-dimethyl-8-nonenenitrile), 20 g tetrafluoroethylene and 15 ml of a 0.05% solution of perfluoropropionylperoxide in 1,1,2-trichloro-1,2,2-trifluoroethane was heated for 3 hours at 50° C. in a stainless steel pressure tube. The contents were removed, washed with aqueous acetone, filtered and dried to give 5.9 g of a white polymer. An infrared spectrum of a film of this polymer showed the presence of a strong ether absorption at 10.2 microns and an absorption at 4.40 microns due to a nitrile. The polymer was estimated to contain 18.2 mole percent (52.7 weight percent) nitrile comonomer by differential thermal analysis.

EXAMPLE 8

A mixture of 25.4 g perfluoro(3,6-dioxa-4-methyl-7-octenesulfonyl fluoride), 8.1 g perfluoro(4,7-dioxa-2,5-dimethyl-8-nonenenitrile), 20 g tetrafluoroethylene and 15 ml of a 0.05% solution of perfluoropropionyl peroxide in 1,1,2-trichloro-1,2,2-trifluoroethane was heated for 3 hours at 50° C. in a stainless steel pressure tube. The contents were removed, washed with aqueous acetone, filtered and dried to give 5.9 g of a white polymer. An infrared spectrum of a film of this polymer showed the presence of sulfonyl fluoride and nitrile groups having absorptions at 6.8 and 4.4 microns, respectively. A film of this terpolymer was reacted with dimethyl sulfoxide, potassium hydroxide and water for 2 hours at 90° C. The infrared spectrum of the resulting film showed no sulfonyl fluoride or nitrile absorption to be present. A new band at 5.95 microns corresponding to the potassium salt of a carboxylic acid was observed. Infrared and titration data indicated that 0.16 meq/g of carboxylate and 0.83 meq/g of sulfonate were present in the final terpolymer.

EXAMPLE 9

A mixture of 92 g $CF_2=CFOCF_2CF(CF_3)OCF_2CF_2COOCH_3$, 102 g 1,1,2-trichloro-1,2,2-trifluoroethane, 20 ml. of a 0.05% solution of perfluoropropionyl peroxide in 1,1,2-trichloro-1,2,2-trifluoroethanol and 125 psi tetrafluoroethylene was heated for 3 hours at 50° C. while adding tetrafluoroethylene to maintain the pressure at 125 psi. The excess gases were vented and the colorless gel-like product was heated under vacuum to remove the unreacted monomers and solvent. The solid residue was washed once with aqueous acetone, twice with acetone, then filtered and dried in a vacuum oven at 100° C. to give 13.2 g. of a white solid. The infrared spectrum of the copolymeric product had strong absorption at 3.4 and 5.6 microns, showing the presence of an ester of a perfluorinated acid. A film of the material was pressed at 220° C., and the ester groups were hydrolyzed at 90° C. for 1 hour in a mixture of dimethylsulfoxide, potassium hydroxide and water. Titration of the material showed it to have an equivalent weight of 1115.

A 5-6 mil thick film was placed in a chloralkali cell, and aqueous sodium chloride was electrolyzed for 35 days at 2 asi to give 27-36% NaOH at a current efficiency of 88-97% and a cell voltage of 4.1-5.9 volts.

EXAMPLE 10

A mixture of 82.8 g $CF_2=CFOCF_2CF(CF_3)OCF_2CF_2COOCH_3$, 112.4 g 1,1,2-trichloro-1,2,2-trifluoroethane, 20 ml. of a 0.05% solution of perfluoropropionyl peroxide in 1,1,2-trichloro-1,2,2-trifluoroethane and 170 psi tetrafluoroethylene was heated for 3 hours at 50° C. while adding tetrafluoroethylene to maintain the pressure at 170 psi. The excess gases were vented and the clear gel like product heated under vacuum to remove the unreacted monomers and solvent. The solid residue was washed twice with aqueous acetone, filtered and dried in a vacuum oven at 100° C. to give 11.8 g of product. A film of the material was pressed at 175° C., and the ester groups hydrolyzed at 90° C. for 1 hour in a mixture of dimethylsulfoxide, potassium hydroxide and water. An infrared spectrum of the hydrolyzed product showed a very strong absorption at 5.9 microns characteristic of a perfluorocarboxylate salt and titration indicated an equivalent weight of 980.

A 6-7 mil thick film was placed in a chloralkali cell, and aqueous sodium chloride was electrolyzed for 18 days at 2 asi to give 25-34% NaOH at a current efficiency of 87-95% and a cell voltage of 3.8-4.0 volts.

EXAMPLE 11

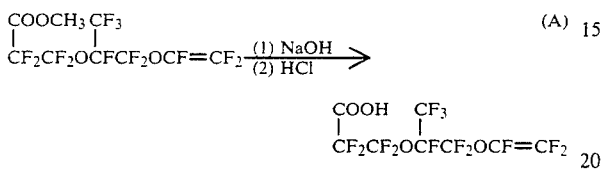
(A)

In a separatory funnel 15 g of crude H$_3$COOCCF$_2$CF$_2$OCF(CF$_3$)CF$_2$OCF=CF$_2$ was shaken with 25 ml of 10% aqueous NaOH at room temperature. The aqueous layer was separated and acidified with cold concentrated HCl. The lower layer which separated was distilled from a little P$_2$O$_5$ to obtain 10.7 g of 3-[2-(trifluoroethenoxy)-1-(trifluoromethyl)trifluoroethoxy]tetrafluoropropionic acid, b.p. 53° C./0.25 mm, n$_D^{25}$=1.3078.

Anal. Calcd. for C$_8$HF$_{13}$O$_4$: C, 23.54; H, 0.25; F, 60.53; Neut. Eq., 408. Found: C, 23.80; H, 0.52; F, 61.71; Neut. Eq., 407.7.

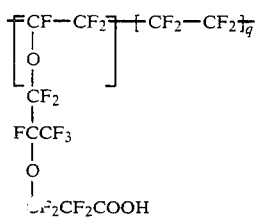
(B)

A glass tube containing 8.8 g of 3-[2-(trifluoroethenoxy)-1-(trifluoromethyl)trifluoroethoxy]tetrafluoropropionic acid, 2.2 g tetrafluoroethylene, 13 ml 1,1,2-trichlorotrifluoroethane and 0.01 ml of a 6% solution of perfluoropropionyl peroxide in 1,1,2-trichlorotrifluoroethane was sealed and rotated at room temperature for 60 hours. Gases were bled off and 3 g tetrafluoroethylene and 0.01 ml of a 6% solution of perfluoropropionyl peroxide in 1,1,2-trichlorotrifluoroethane were added. The tube was sealed, rotated overnight at room temperature and then opened. Filtration and washing in ether yielded 2.3 g of copolymer of the repeating unit indicated above. A pressed film showed strong infrared absorption for —COOH.

EXAMPLE 12

(A) Titration of 12.671 g (0.031 m) of 3-[2-(trifluoroethenoxy)-1-(trifluoromethyl)trifluoroethoxy]tetrafluoropropionic acid to a neutral end point (phenolphthalein indicator) with 15.54 ml of 0.2N sodium hydroxide indicated a neutral equivalent of 407.69 (Calcd.408). An excess of 1 ml of 0.2N NaOH was added and the solution frozen in a 50 ml Carius tube. Then a solution of 0.25 g ammonium persulfate in 10 ml water, a solution of 0.2 g Na$_2$S$_2$O$_3$.5H$_2$O in 10 ml water and 3.1 g tetrafluoroethylene were added separately with freezing before sealing the tube. The tube was rotated overnight at room temperature to obtain a clear solution and a little solid polymer. The solution was filtered and acidified to give a gel which was mostly soluble in ether. Removal of ether and drying at 100° C. under vacuum gave 3.2 g of copolymer from which a film was pressed at 100° C./10,000 psi. The copolymer absorbed strongly in the infrared for —COOH (broad 3μ and 5.7μ).

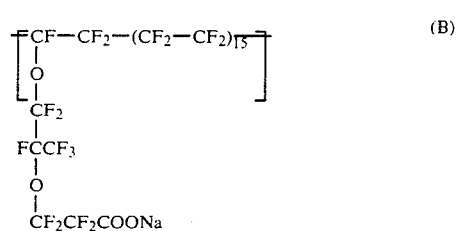
(B)

Using the general procedure of part (A) of this example, a 200 ml Carius tube containing 6 g (0.015 m) of 3-[2-(trifluoroethenoxy)-1-(trifluoromethyl)trifluoroethoxy]tetrafluoropropionic acid neutralized with a slight excess of 0.2N sodium hydroxide, 0.25 g ammonium persulfate in 10 ml water, 0.02 g Na$_2$S$_2$O$_3$.5H$_2$O in 10 ml water and 10 g tetrafluoroethylene was rotated overnight at room temperature and then cooled and opened. A gel-like polymer (sodium salt) was collected by filtration and vacuum dried at 100° C. to give 6.5 g of copolymer of the average composition indicated by the above repeating unit (neutral equivalent by titration 1976). The filtrate was acidified to give an acid copolymer which was collected by filtration and vacuum dried at 100° C. (wt. 5.8 g).

Although the invention has been described by way of specific embodiments, it is not intended to be limited thereto. As will be apparent to those skilled in the art, numerous embodiments can be made without departing from the spirit of the invention or the scope of the following claims.

We claim:

1. A film or membrane having a base layer of a fluorinated ion exchange polymer which has pendant side chains with terminal groups consisting essentially of —CF$_2$CF$_2$SO$_2$R$^2$ wherein R$^2$ is F, Cl or OR$^3$; R$^3$ is H, or $$M_{(1)\over t};$$

M is alkali metal, ammonium or quaternary ammonium; and t is the valence of M and having on at least one surface thereof a layer consisting essentially of a polymer having the repeating units

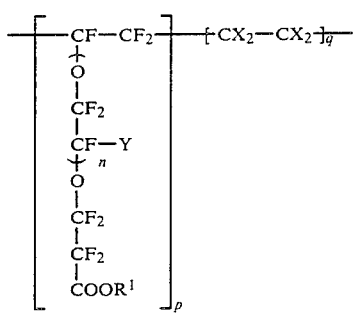

wherein n is 1 or 2, p is 1 to 10, q is 3 to 15, the X's taken together are four fluorines or three fluorines and one chlorine, Y is F or $CF_3$, $R^1$ is H, lower alkyl or $$M_{(1)\over t},$$

M is alkali metal, ammonium or quaternary ammonium, and t is the valence of M, each layer having an equivalent weight no greater than about 1500 and no less than about 625.

2. The film or membrane of claim 1 wherein the X's taken together are four fluorines.

3. The film or membrane of claim 2 wherein n is 1.

4. The film or membrane of claim 3 wherein Y is $CF_3$.

5. The film or membrane of claim 4 wherein the layer of polymer on the base layer has an equivalent weight no greater than about 1250 and no less than about 770.

6. The film or membrane of claim 4 wherein each layer has an equivalent weight no greater than about 1250 and no less than about 770.

7. The film or membrane of claim 1 wherein the base layer of polymer having pendant side chains with —$CF_2CF_2SO_2R^2$ terminal groups is melt pressed together with the layer of the polymer having repeating units of

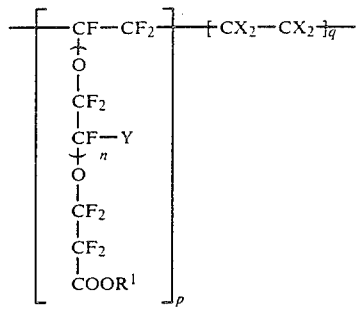

8. An electrolytic cell comprising a housing with separate anode and cathode sections, said cell separated by the film or membrane of claim 1.

9. In a process of production of halogen and metal hydroxide of an alkali, or combinations thereof, by electrolysis of a halide of said metal employing separate anode and cathode sections in an electrolytic cell, the improvement comprising passing ions of said metal through the film or membrane of claim 1, the base layer of which has sulfonyl groups at least a majority of which are present as ion exchange sites in ionic form, and the surface layer of the polymer having the repeating units

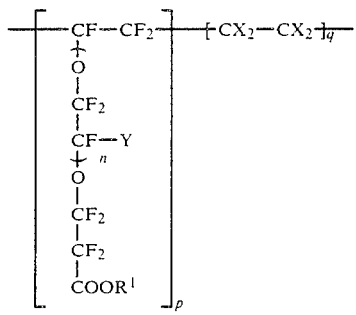

wherein n is 1 or 2, p is 1 to 10, q is 3 to 15, the X's taken together are four fluorines or three fluorines and one chlorine, Y is F or $CF_3$, $R^1$ is H, lower alkyl or $$M_{(1)\over t}.$$

M is alkali metal, ammonium or quaternary ammonium, and t is the valence of M, facing the cathode portion of the cell.

* * * * *